United States Patent
Tanaka et al.

(10) Patent No.: US 7,138,482 B2
(45) Date of Patent: Nov. 21, 2006

(54) PRODUCTION METHOD OF POLYAMIDE

(75) Inventors: Kazumi Tanaka, Niigata (JP); Hideyuki Kurose, Niigata (JP); Takatoshi Shida, Niigata (JP); Minoru Kikuchi, Niigata (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 162 days.

(21) Appl. No.: 10/701,440

(22) Filed: Nov. 6, 2003

(65) Prior Publication Data

US 2005/0119446 A1   Jun. 2, 2005

(30) Foreign Application Priority Data

Nov. 7, 2002 (JP) .............................. 2002-324089
Nov. 7, 2002 (JP) .............................. 2002-324090
Nov. 7, 2002 (JP) .............................. 2002-324091

(51) Int. Cl.
*C08G 69/04* (2006.01)
*C08G 69/28* (2006.01)
*C08G 69/26* (2006.01)

(52) U.S. Cl. ................. 528/310; 528/312; 528/322; 528/332; 528/335; 528/336; 528/340

(58) Field of Classification Search ........... 528/332, 528/310, 312, 322, 335, 336, 340
See application file for complete search history.

(56) References Cited

U.S. PATENT DOCUMENTS

| | | | | |
|---|---|---|---|---|
| 4,831,108 A | * | 5/1989 | Richardson et al. | 528/335 |
| 5,723,567 A | * | 3/1998 | Hewel et al. | 528/310 |
| 6,303,741 B1 | * | 10/2001 | Tanaka | 528/332 |
| 6,489,435 B1 | * | 12/2002 | Tanaka et al. | 528/310 |
| 6,610,816 B1 | * | 8/2003 | Kurose et al. | 528/310 |
| 6,657,037 B1 | * | 12/2003 | Tanaka et al. | 528/170 |
| 6,693,163 B1 | * | 2/2004 | Tanaka et al. | 528/310 |
| 6,841,651 B1 | * | 1/2005 | Maruo et al. | 528/310 |
| 6,881,477 B1 | * | 4/2005 | Presenz et al. | 428/357 |
| 2005/0119446 A1 | * | 6/2005 | Tanaka et al. | 528/310 |

* cited by examiner

*Primary Examiner*—P. Hampton Hightower
(74) *Attorney, Agent, or Firm*—Antonelli, Terry, Stout and Kraus, LLP.

(57) ABSTRACT

In the production method of polyamide of the present invention, the mole balance at a set point during melt polymerization is estimated from a pre-established equation for calculating the mole balance during melt polymerization from a melt viscosity. On the basis of the estimated mole balance, the subsequent conditions of melt polymerization of a batch and the polymerization conditions of the next and subsequent batches are determined. In addition, the mole balance, molecular weight and relative viscosity of melt-polymerized polyamide are estimated from pre-established equations each for respectively calculating the mole balance, molecular weight and relative viscosity at the end point of melt polymerization from the melt viscosity. The conditions for solid phase-polymerizing the melt-polymerized polyamide are determined on the basis of estimated values.

28 Claims, No Drawings

PRODUCTION METHOD OF POLYAMIDE

BACKGROUND OF THE INVENTION

1. Field of the Invention

The present invention relates to a production method of polyamides employing a rapid estimation of the mole balance of polyamides during a melt polymerization process, and more specifically, relates to a production method of polyamides by melt polymerization in a batch polymerization vessel employing a rapid estimation of the mole balance of polyamides under melt polymerization from a melt viscosity during melt polymerization process. The present invention further relates to a production method of polyamides by further solid phase-polymerizing a melt-polymerized polyamide, more specifically, relates to a production method of solid phase-polymerized polyamides by the solid phase polymerization of melt-polymerized polyamides in which properties of the starting melt-polymerized polyamides are rapidly and easily estimated to determine solid phase polymerization conditions (time, temperature, pressure) from the estimated results. The present invention still further relates to a method of easily estimating the melt viscosity, more specifically, relates to a method of calculating the melt viscosity of polyamides from a stirring torque of a melt polymerization system for producing polyamides in a batch polymerization vessel.

2. Description of the Prior Art

Generally, a melt-polymerized polyamide is produced by the dehydrating polycondensation of a diamine monomer and a dicarboxylic acid monomer, in which the monomers are melt-polymerized at reaction temperatures higher than the melting point of polyamide being produced. In the production of polyamide, it is important to maintain the preset mole balance and the preset polymerization conditions to ensure the production of polyamide with uniform and stable quality. Therefore, various methods have been employed to maintain the preset values of mole balance, polymerization time, polymerization temperature, polymerization pressure, etc.

The mole balance is a particularly important process factor to be precisely controlled, because it has a significant influence on the polymerization degree of melt-polymerized polyamide. In batch polymerization method, however, the escape of diamine out of the reaction system during polymerization is difficult to avoid and it is quite difficult to make the escaped amount always uniform from batch to batch, even if the preset mole balance at the initial charge of monomers is the same in every batch and the polymerization conditions are made uniform from batch to batch. Therefore, the mole balance of polyamide to be produced is out of control and actually depends how the polymerization proceeds.

If the mole balance is not uniform from batch to batch, the polymerization time should be adjusted depending on the batch-to-batch variation of mole balance to make the polymerization degree of resultant polyamide uniform from batch to batch. In other words, if the mole balance varies from batch to batch, the real time observation of polymerization degree, if possible, would enable the discharge of polyamide at a stage where the aimed polymerization degree is reached, thereby making the polymerization degree of the resultant polyamide stable from batch to batch. The batch-to-batch stability of polymerization degree of polyamide would result in the batch-to-batch stability of flow characteristics, such as melt viscosity, molecular weight and relative viscosity of molten polyamide, which affect the moldability and processability.

The mole balance is generally determined by titration analysis which takes several hours because a polyamide which is taken out of a melt polymerization vessel and then solidified is used as the analyzing sample. The sample is dissolved into a specific solvent and subjected to neutralization titration to determine the concentration of terminal carboxyl and the concentration of terminal amino. From the titration results, the mole balance is calculated. Therefore, it is difficult to feed back the measured results of the mole balance in a preceding batch to the next batch before determining the production conditions. If the mole balance can be quickly determined during melt polymerization, a measure quite effective for determining the subsequent melt polymerization conditions of the same batch or the next batch is obtained, thereby providing an industrially significant method.

Japanese Patent Publication No. 48-36957 proposes a real-time measurement of properties by a viscometer in the continuous production of polyamide. In the proposed method, the melt viscosity which is related to the polymerization degree can be quickly determined during melt polymerization without using chemical analysis. However, the document is quite silent as to the measurement of the mole balance. A capillary viscometer is taught to be generally used. In a batch polymerization, however, the use of such a viscometer is expected to cause severe difficulty which is not encountered by a continuous polymerization. The content of reaction liquid changes from the starting monomers to polyamide just before discharge, and its viscosity may change from 0.01 to about 500 Pa·s. If the solubility of the starting material to polyamide is not sufficient, the capillary is clogged to make a stable use of viscometer difficult. In addition, the viscometer is generally an expensive measuring device to increase equipment cost.

Recently, an on-line measurement of polymer properties using a near infrared spectrometer has been proposed. Near infrared ray is quite suitable for non-destructive analysis and real time analysis because of its transmitting properties superior to ultraviolet ray and infrared ray. Problems in stability of light source, spectrometry system, detector, and hard ware and soft ware for computing spectra has prevented it from being put into practical use. Recent development in the technique has solved many of the problems and the near infrared spectrometer has come into the market.

Production methods of polyester in which properties of polyester are measured using a near infrared spectrometer and the reaction conditions are controlled by the measured values are disclosed, for example, in Japanese Patent Application Laid-Open Nos. 2-306937, 10-182802, 11-60711 and 11-315137. Japanese Patent Application Laid-Open No. 6-322054 proposes a production method of phenol resin in which the chemical composition of the system is measured by a near infrared spectrometer and the reaction is continued by estimating the progress of reaction on the basis of measured values. WO 96/05498 discloses a method of controlling the amount of solvent in a reaction solution by measuring the concentration of a solution comprising an amide solvent and an aromatic polyamide using a near infrared spectrometer. WO 96/16107 discloses a production method of polyamide by a continuous melt polymerization employing a near infrared spectrometer. In the proposed method, the concentrations of carboxyl end group (terminal carboxyl) and amino end group (terminal amino) are measured. The feeding amount of diamine is controlled on the basis of the measured results to control the ratio between the concentrations of carboxyl end group and amino end group, thereby attaining the aimed mole balance and preventing the formation of solid matters in the reaction apparatus.

To obtain precise measured results by a near infrared spectrometer, the solution under measurement should be homogeneous, requiring the removal of bubbles in the solution. However, the removal of bubbles are accompanied by a considerable difficulty in the production of polyamide, because it involves the elimination of water. In addition, since the lower limit for the measurement by a near infrared spectrometer is close to the controlling range of mole balance to be required for polyamide, it is questionable whether the measured results are effective information. Further, a near infrared spectrometer is expensive and the installation thereof into a polymerization vessel requires a considerable cost in the conversion of polymerization vessel, etc.

Generally, as a molding polyamide, a polyamide with low viscosity is used because it is molded by injection molding and so required to be highly flowable in molten state. In the applications to bottle, sheet, film and fiber, polyamide is molded also by extrusion in addition to injection molding. Therefore, polyamide with moderate to high viscosity is used in the applications to bottle, sheet, film and fiber because a flowability in molten state lower than that of the molding polyamide is required.

As the low viscosity polyamide for use mainly as molding material, a melt-polymerized polyamide is used as it is or after drying. If the moderate to high viscosity polyamide for use mainly as bottle, sheet, film or fiber is intended to produce by melt polycondensation, a specific polymerization apparatus is required because a stirring device commonly used cannot generate a stirring force enough to maintain the uniform molten state in the polymerization vessel. If the polycondensation is continued from a low viscosity until a moderate to high viscosity is reached, the time for maintaining the molten state (reaction time) is prolonged to cause damage of polyamide molecule (degradation of polymer molecule due to radical generation) and abnormal reaction such as non-linear molecule propagation (formation of three-dimensional polymer), this in turn increasing the formation of gel and fish eye to invite practical disadvantage. Therefore, the moderate to high viscosity polyamide has been produced by a solid phase polymerization in which a low viscosity polyamide is first produced by a melt polycondensation and then heat-treated in solid phase.

The solid phase polymerization of polyamide is generally conducted by calculating the increase of polymerization degree during the solid phase polymerization from solid phase polymerization temperature, time and pressure using a rate equation of amidation reaction while taking the mole balance and properties relating to the polymerization degree such as molecular weight and relative viscosity of the starting polyamide into consideration, by determining the conditions of solid phase polymerization on the basis of the calculated results, and by terminating the solid phase polymerization when the aimed polymerization degree is reached. The mole balance of the starting polyamide is an important property to be surely taken into account because it significantly affects the increasing speed of the polymerization degree. To evaluate the increasing polymerization degree during the solid phase polymerization, the polymerization degree of the starting polyamide is necessary. Thus, the analysis of the properties relating to the polymerization degree such as molecular weight and relative viscosity is required before solid phase polymerization.

A solid phase polymerization without analyzing the starting polyamide is known, in which polyamide under solid phase polymerization is sampled and rapidly measured on its melt viscosity, etc., and the polymerization degree during the solid phase polymerization is estimated from the measured results thereby to determine the end point of the solid phase polymerization. However, since the solid phase polymerization of polyamide is of high reaction rate as compared with polyester, the solid phase polymerization of polyamide has limited time for determining its end point, this making the operation restless.

If the mole balance and polymerization degree of melt-polymerized polyamide to be used as the starting material of the solid phase polymerization are always constant, the analysis is not required for each time. As mentioned, however, the mole balance of melt-polymerized polyamide depends on the progress of the polymerization. The batch-to-batch variation of mole balance results in the batch-to-batch variation of polymerization degree (molecular weight, relative viscosity, etc.) which is significantly affected by the mole balance.

The mole balance, molecular weight and relative viscosity of melt-polymerized polyamide are generally chemically analyzed. The mole balance and number average molecular weight are determined, for example, from the calculation using the measured values which are obtained by the measurement of a carboxyl end concentration and an amino end concentration by neutralization titration of a solution of polyamide in a specific solvent. The relative viscosity is determined by dividing a dropping time (second) of a polyamide solution in concentrated sulfuric acid measured using a viscometer by a dropping time (second) of sulfuric acid itself. These chemical analyses usually require 2 to 4 h until the results are obtained. Therefore, the melt-polymerized polyamide should be stored in a silo, etc. before solid phase polymerization until the results of analyses are obtained, thereby preventing the efficient production.

SUMMARY OF THE INVENTION

An object of the present invention is to provide a production method of polyamide by batch melt polymerization employing a rapid and simple estimation of the mole balance during the melt polymerization. Another object of the present invention is to provide a production method of polyamide by solid phase polymerization of a melt-polymerized polyamide employing a rapid and simple estimation of the properties of the melt-polymerized polyamide which are required for determining the conditions of the solid phase polymerization. Still another object of the present invention is to provide a production method of polyamide by batch melt polymerization employing a rapid and simple estimation of the melt viscosity, molecular weight or relative viscosity of the polyamide under melt polymerization.

As a result of extensive study, the inventors have found that, in the production of polyamide by batch melt polymerization, the mole balance (diamine unit/dicarboxylic acid unit) of the polyamide under melt polymerization can be calculated from the melt viscosity of the polyamide under melt polymerization. The inventors have further found that the mole balance (diamine unit/dicarboxylic acid unit), molecular weight and relative viscosity of polyamide can be calculated from the melt viscosity of polyamide under melt polymerization, and that the melt-polymerized polyamide is efficiently solid phase-polymerized by determining the conditions of the solid phase polymerization from the calculated values. The inventors still further found that, in the production of polyamide by batch melt polymerization, the melt viscosity, molecular weight and relative viscosity of the polyamide under melt polymerization can be calculated from the stirring torque of polyamide during the melt polymerization. The present invention has accomplished on the basis of these findings.

Thus, the present invention relates to a production method of polyamide by batch melt polymerization, which comprises a step of developing at least one estimating equation selected from the group consisting of an estimating equation for calculating a mole balance (diamine unit/carboxylic acid unit) of polyamide under melt polymerization from a melt viscosity of polyamide which is measured at a set point during the melt polymerization, an estimating equation for calculating a molecular weight of polyamide under melt polymerization from the melt viscosity of polyamide, and an estimating equation for calculating a relative viscosity of polyamide under melt polymerization from the melt viscosity of polyamide; and a step of estimating using the estimating equation at least one property selected from the group consisting of a mole balance, a molecular weight and a relative viscosity of polyamide under melt polymerization from a melt viscosity of polyamide which is measured at a set point during melt polymerization in next and subsequent batches.

The present invention further relates to a production method of polyamide by solid phase polymerization of batch melt-polymerized polyamide, which comprises (1) developing an estimating equation for calculating a mole balance (diamine unit/carboxylic acid unit) of polyamide under melt polymerization from a melt viscosity of polyamide measured at a set point during the melt polymerization, and calculating from the estimating equation the mole balance of polyamide at the set point during the melt polymerization in next and subsequent batches; (2) developing an estimating equation for calculating a molecular weight or relative viscosity of polyamide from the melt viscosity, and calculating from the estimating equation the molecular weight or relative viscosity at an end point of the melt polymerization in next and subsequent batches; and (3) determining conditions (temperature, time and pressure) of the solid phase polymerization of the melt-polymerized polyamide from the calculated values in the steps (1) and (2).

The present invention still further relates to a production method of polyamide, in which the melt viscosity for calculating the mole balance, molecular weight and relative viscosity is calculated from a stirring torque generated by rotation of stirring blade for stirring and mixing the polyamide.

DETAILED DESCRIPTION OF THE INVENTION

The set point during the melt polymerization referred to herein means a measuring point of the melt viscosity in which the amidation history, which is governed by the rate constant of amidation, temperature, time, pressure (moisture content), from the initiation of polymerization to the measurement of melt viscosity is the same as the history undergone until measuring the melt viscosity in the process for developing the estimating Equation A which will be mentioned below. Although not fixed to a particular stage of the melt polymerization, the set point is preferably at a middle or later stage of polymerization where the fixation of monomers is substantially completed, because it is intended to estimate the mole balance of polyamide under melt polymerization. To make the history of amidation uniform from batch to batch, it is operationally easy to use the same additive which affects the rate constant of amidation reaction and to make the time, temperature and pressure from the initiation of amidation reaction uniform in every batch. To determined the set point based on the temperature of reaction system when the pressure is equal, the polymerization history until the set point temperature is reached is regulated constant by controlling the heating conditions by a heating medium, and the time to be taken from the initiation of amidation reaction to the set point is regulated preferably within ±5 min, more preferably within ±3 min of the average time between batches. To determined the set point based on the reaction time when the pressure is equal, the polymerization history until the set point time is reached is regulated constant by controlling the heating conditions by a heating medium, and the temperature at the set point is regulated preferably within ±1° C., more preferably within ±0.5° C. of the average temperature between batches. To regulate the polymerization history uniform by controlling the heating conditions by a heating medium, total amount of charged monomers, escaped amount of monomer, and stirring and mixing efficiency of batch polymerization vessel are required to be uniform between batches.

The end point of melt polymerization referred to herein means a stage just before discharging polyamide from the batch polymerization vessel, and means that the polyamide solidified by rapid cooling after discharging and the polyamide present in the polymerization vessel at the end point of the melt polymerization have substantially the same properties relating to the polymerization degree such as molecular weight and relative viscosity. Unlike the set point during the melt polymerization, the history of amidation reaction until the end point of the melt polymerization is not needed to be the same from batch to batch. However, since the measurement of the melt viscosity is necessary at the two points (set point and end point), there is no need to change the history of amidation after the set point between batches. The difference of the temperatures at the end point of melt polymerization between batches can be corrected in the estimating equations B and C, and the temperatures are not necessary to be the same. However, it is preferred to make the temperatures uniform to improve the accuracy of the estimation with minimized error. Thus the batch-to-batch variation of temperature is regulated preferably within ±5° C., more preferably within ±3° C.

To estimate the mole balance of polyamide from the melt viscosity at the set point during the melt polymerization, it is preferred to calculate it from the estimating equation developed from the actually measured mole balance and melt viscosity in several batches, preferably in five batches or more. Although the melt viscosity and the mole balance may be apparently not in phisicochemical correlation with each other, the mole balance can be estimated from the melt viscosity with a fair accuracy when the polymerization history such as temperature, time and pressure until reaching the set point for measuring the melt viscosity is uniform.

First, in a specific mole balance, the number average molecular weight of the polyamide obtained at the set point was calculated using a second-order rate equation of amidation, while fixing all the reaction conditions such as the total amount of molten adipic acid and m-xylylene diamine, the temperature of molten adipic acid when starting the dropwise addition of m-xylylene diamine, the dropwise addition time of m-xylylene diamine and the temperature rise history during the dropwise addition, the temperature of the reaction solution when completing the dropwise addition of m-xylylene diamine, and the time and temperature history from completing the dropwise addition of m-xylylene diamine until reaching the set point. Then, using the number average molecular weight thus obtained, the melt viscosity of polyamide at a given temperature was calculated from the preformulated Equation B to be mentioned below. These series of calculations were repeated while appropriately changing the mole balance. The melt viscosity and the mole balance have a definite correlation with each other, showing that an estimating equation for calculating the mole balance from the melt viscosity at the set point during the melt polymerization can be formulated.

The melt viscosity and the mole balance are in curved relationship in the mole balance range of 0.997 to 1.003. In this range, the difference in the mole balance is hardly reflected as the difference in the melt viscosity, and it is difficult to determine which of dicarboxylic acid and diamine is in excess in the region centering around mole balance=1. Therefore, the mole balance is preferably estimated in the mole balance ranges of 0.997 or less, and 1.003 or more, because from the amounts of monomers actually added it can be easily determined in these ranges which of dicarboxylic acid and diamine is in excess. The mole balance can be easily estimated from the following linear estimating Equation A:

$$\text{Mole balance} = a \times MV + b \qquad (A)$$

wherein MV is melt viscosity (Pa·s), and a and b are empirical constants.

The actual mole balance is calculated from the carboxyl end concentration (terminal carboxyl concentration) and the amino end concentration (terminal amino concentration) which are measured by known titration analysis on solidified specimen of sampled reaction solution. The specimen for the analysis may be a solidified reaction solution which is taken out at the set point during the melt polymerization or may be a polyamide taken out after completing the polymerization if the set point during the melt polymerization is a later stage of the polymerization where the escape of monomer no longer occurs.

To estimate the molecular weight of polyamide from the melt viscosity at the end point of the melt polymerization, it is preferred to develop the estimating equation from the molecular weight and melt viscosity actually measured in several batches, preferably in five batches or more. For example, the sampled reaction solution is analyzed by a melt viscometer such as a melt indexer and a flow tester to measure the melt viscosity and analyze the molecular weight. The following Equation B is formulated from the results, by which the molecular weight can be calculated from the melt viscosity:

$$c \times \log(MW) = \log(MV) + d/T + e \qquad (B)$$

wherein MW is molecular weight, MV is melt viscosity (Pa·s), T is temperature (° C.), and c, d and e are empirical constants.

The molecular weight used herein may be any molecular weight such as number average molecular weight, weight average molecular weight and viscosity average molecular weight, and Equation B can be empirically determined.

To estimate the relative viscosity of polyamide from the melt viscosity at the end point of the melt polymerization, it is preferred to develop the estimating equation from the relative viscosity and melt viscosity actually measured in several batches, preferably in five batches or more. For example, the sampled reaction solution is analyzed by a melt viscometer such as a melt indexer and a flow tester to measure the melt viscosity and analyze the relative viscosity. The following Equation C is formulated from the results, by which the relative viscosity can be calculated from the melt viscosity:

$$f \times \log(RV) = \log(MV) + g/T + h \qquad (C)$$

wherein RV is relative viscosity, MV is melt viscosity (Pa·s), T is temperature (° C.), and f, g and h are empirical constants.

The relative viscosity to be calculated from Equation C is a common property for evaluating the polymerization degree of polyamide, and corresponds to a relative viscosity calculated from (dropping time of sample solution)/(dropping time of solvent), where the solvent is sulfuric acid, fromic acid, etc. with a specific purity (concentration), the sample solution is prepared by dissolving polyamide into the solvent in a specific concentration, and the dropping time is measured by a capillary viscometer.

The melt viscosity can be measured by analyzing a sampled reaction solution by a melt viscometer such as a melt indexer and a flow tester. However, a real time measurement of the melt viscosity is more preferred. For the real time measurement, the batch polymerization vessel is preferably equipped with a viscosity analyzer such as a capillary viscometer. More easy and very effective method for the real time measurement is to calculate the melt viscosity from the stirring torque generated by the rotation of stirring blade for stirring and mixing polyamide. This method requires a torque meter for detecting the stirring torque which is connected to the stirring blade. The stirring device usually available is equipped with the torque meter. The relationship between the stirring torque and the melt viscosity can be easily expressed by an empirical or experimental equation. For example, the melt viscosity can be calculated from the stirring torque and the rotation number of the stirring blade using Equation D:

$$MV = i \times ST/NR + j \qquad (D)$$

wherein MV is melt viscosity (Pa·s), ST is stirring torque (N·m), NR is number of rotation (rpm), and i and j are empirical constants.

The number of rotation of the stirring blade can be corrected in Equation D and is not particularly limited, but the number of rotation is preferably made constant to enhance the accuracy of estimation with minimized error. The variation of the number of rotation in the same batch and from batch to batch is regulated preferably within ±5 rpm, more preferably within ±3 rpm.

The type of the stirring blade is not specifically limited and various types of stirring blade such as anchor blade, ribbon blade, double helical ribbon blade, grid blade, turbine blade, paddle blade, propeller blade, disk blade, spectacle blade, and any combination thereof may be used. In any event, it is preferred to design the stirring blade so as to be sensitive to the difference in the melt viscosity at the set point for calculating the mole balance and at the end point for calculating the molecular weight and relative viscosity. In addition, the stirring blade is required to exhibit a sufficient stirring and mixing efficiency over the viscosity range throughout the polymerization, for example, the viscosity range of 0.01 to about 500 Pa·s.

In any of the methods for measuring the melt viscosity, the detecting limit of the melt viscosity difference at the set point during the melt polymerization is preferably 10 Pa·s or more, more preferably 3 Pa·s or more, and still more preferably 1 Pa·s or more.

In the present invention, the melt viscosity of polyamide is measured at the set point during the melt polymerization and at the end point of the melt polymerization. Since moisture has a plasticizing effect on polyamide, the presence of moisture in a large amount causes errors in the measurement of melt viscosity. Therefore, the moisture content of polyamide around the set point and the end point is preferably less than four times the saturated moisture content, more preferably less than two times the saturated moisture content. The pressure when measuring the melt viscosity, particularly the pressure when measuring the stirring torque, which significantly affects the moisture content, is preferably the same as the pressure at the time when the above estimating equations are formulated. The pressure variation from batch to batch is preferably within ±10 kPa, more preferably within ±2 kPa.

To enhance the accuracy of the estimating equation for calculating the melt viscosity of polyamide from the stirring torque, the total amount of polyamide in the batch polymerization vessel is preferably uniform from batch to batch. To ensure this, the variation of total amount of the polyamide from the preceding batch remaining in the batch polymerization vessel and the starting material for polyamide newly charged into the batch polymerization vessel is regulated preferably within ±1/50, more preferably within ±1/100, and still more preferably within ±1/200 of the average total amount between batches which are conducted to develop the equation expressing the relationship between the stirring torque and the melt viscosity.

In the present invention, the point for measuring the stirring torque during the melt polymerization may be any stage of the melt polymerization as far as the pressure condition and the total amount are uniform from batch to batch, as mentioned above. However, to determine the subsequent polymerization conditions (time, pressure, temperature) and the timing of discharge from the melt viscosity, molecular weight and relative viscosity each being calculated from the stirring torque, the stirring torque is preferably measured at a middle or later stage of the polymerization where the fixation of monomers is substantially completed. As mentioned above, the pressure when measuring the stirring torque should be uniform between batches. The number of rotation of the stirring blade and the temperature at the measuring point can be corrected, for example, in Equations A to C, and is not needed to be uniform between batches. However, they are preferably made uniform for ensuring the estimation with higher accuracy. To attain estimation results with high accuracy, the variation of the number of rotation at the measuring point is regulated preferably within ±5 rpm, more preferably within ±3 rpm of the average number of rotation between batches which are performed when the estimating equation is developed. The variation of temperature is regulated preferably within ±5° C., more preferably ±3° C. of the average temperature between batches which are performed when the estimating equation is developed.

The pressure at the measuring point should be constant within a batch as mentioned above, but the amidation history until the measuring point is not needed to be the same. The number of rotation and the temperature can be corrected, for example, in Equations A to C, and are not needed to be constant within a batch. However, they are preferably made constant for ensuring the calculation with higher accuracy. To attain estimation results with high accuracy, the variation of the number of rotation of stirring blade is regulated preferably within ±5 rpm, more preferably within ±3 rpm of the average number of rotation within a batch. The variation of temperature is regulated preferably within ±5° C., more preferably ±3° C. of the average temperature within a batch.

The melt polymerization method of the present invention can be practiced by a pressure method using a solution of nylon salt as the raw material and a method where diamine is directly added to molten dicarboxylic acid in the absence of solvent, with the later method being preferred because the variation of reaction conditions within a batch is small.

The method where diamine is directly added to molten dicarboxylic acid in the absence of solvent is a melt polymerization method effective for ensuring a batch-to-batch uniformity in quality, because the addition amount of diamine in a batch can be timely regulated based on the mole balance calculated from the melt viscosity according the present invention.

Even if the viscosity properties (melt viscosity, molecular weight, relative viscosity) of polyamide are made uniform from batch to batch, the batch-to-batch uniformity of the mole balance is still important, because the mole balance is a major factor to change the viscosity properties during melt molding and melt processing. The fixation of diamine is quite important for controlling the mole balance. In the method where diamine is directly added to molten dicarboxylic acid in the absence of solvent, it is appear that a liquid diamine is more efficiently fixed as compared with a gaseous diamine. Therefore, the use of a diamine having a boiling point higher than the melting point of polyamide being produce can avoid the use of high pressure for fixing the diamine and enables the reaction at around atmospheric pressure to reduce equipment costs. Thus, the boiling point of diamine is preferably 5° C. or more, more preferably 10° C. or more higher than the melting point of polyamide. The melting point of polyamide is the temperature of endothermic peak attributable to the heat of crystal fusion observed in DSC analysis. By heating the reaction system to temperatures higher than the melting point, a uniform stirring and mixing can be attained. In case of a hardly crystallizable or non-crystallizable polyamide which shows no definite crystal fusion, the melting point means a flow initiating temperature at which a uniform stirring and mixing can be attained.

Examples of diamines suitably used as the diamine component in the present invention include xylylene diamines such as m-, p- and o-xylylene diamines and bis(aminomethyl)cyclohexanes such as 1,2-, 1,3- and 1,4-bis(aminomethyl)cyclohexanes. In view of practical properties of resultant polyamide, if xylylene diamine is used, the diamine component comprises preferably 50 mol % or more, more preferably 70 mol % or more of m-xylylene diamine. If bis(aminomethyl)cyclohexane is used, the diamine component comprises preferably 50 mol % or more, more preferably 70 mol % or more of 1,3-bis(aminomethyl)cyclohexane.

Examples of other diamines usable in the present invention include tetramethylene diamine, pentamethylene diamine, hexamethylene diamine, octamethylene diamine, nonamethylene diamine, and p-phenylene diamine. A diamine having a boiling point lower than melting point of polyamide +5° C. may be used in an amount of less than 30 mol % of the diamine component and in an amount not making the fixation difficult.

Examples of dicarboxylic acids used as the dicarboxylic acid component include adipic acid, succinic acid, sebacic acid, dodecanedioic acid, isophthalic acid, terephthalic acid and 2,6-naphthalenedicarboxylic acid. These carboxylic acids may be used alone or in combination of two or more. In view of practical properties of resultant polyamide, the dicarboxylic acid component preferably comprises adipic acid in an amount of 50 mol % or more.

Examples of polyamide constituting components other than the diamine and dicarboxylic acid include lactams such as caprolactam, valerolactam, laurolactam and undecalactam, and aminocarboxylic acids such as 11-aminoundecanoic acid and 12-aminododecanoic acid.

In both the case of carrying out the present invention by the pressure method using a solution of nylon salt as the raw material and by the method where diamine is directly added to molten dicarboxylic acid in the absence of solvent, the escape of starting material, particularly, the escape of diamine component out of the reaction system cannot be avoided. Therefore, the batch polymerization vessel is required to have a partial condenser. Water vapor and the diamine are separated in the partial condenser and the diamine is returned to the polymerization vessel, thereby effectively preventing the escape of diamine component. The temperature of partial condenser is preferably 90 to 120° C., more preferably 95 to 115° C., when the polymerization is conducted under atmospheric pressure.

The solid phase polymerization of the present invention may be carried out in any of batch manner, continuous manner and semi-continuous manner. In the batch manner, the melt-polymerized polyamide is solid phase-polymerized in an inert gas atmosphere or under reduced pressure using a batch heating apparatus such as a rotary drum. In the continuous manner, the melt-polymerized polyamide is crystallized by heating under inert gas flow in a grooved stirring-heating apparatus (pre-crystallization treatment), and then solid phase-polymerized under inert gas flow in a hopper heating apparatus. In the semi-continuous manner, the melt-polymerized polyamide is crystallized in a grooved stirring-heating apparatus, and then solid phase-polymerized in a batch heating apparatus such as a rotary drum. As the batch heating apparatus, a heating apparatus of rotary drum type called as tumble dryer, conical dryer or rotary dryer, and a conical heating apparatus having a rotary blade in its inside called as Nauta mixer are preferably used, although not limited thereto.

The melt-polymerized polyamide and the solid phase-polymerized polyamide produced in the present invention is suitably used also as nano-composite materials and oxygen-scavenging materials.

The present invention will be explained in more detail by reference to the following examples which should not be construed to limit the scope of the present invention. The measurements for evaluations were carried out by the following methods.

(1) Stirring Torque

The stirring torque generated by the rotation of stirring blade for stirring and mixing polyamide was read from a torque meter connected to the stirring blade. Anchor blade was used as the stirring blade and the measuring accuracy of stirring torque was 0.01 N·m.

(2) Melt Viscosity

After reading the stirring torque, molten polyamide was discharged from the batch polymerization vessel, which was received by a stainless receiver heated to the same temperature (about 260° C.) as that of the reaction solution and then the melt viscosity thereof was immediately measured by a flow tester "CFT-500C" manufactured by Shimadzu Corporation under conditions of 981 kPa load, 1 mmϕ die, 10 mm length, measuring temperature which was the same as that of reaction solution when polyamide was discharged, and one minute preheating time.

(3) Terminal Amino Concentration

After reading the stirring torque, molten polyamide was discharged from the batch polymerization vessel, which was solidified by cooling and dried. Into 30 cc of solvent of phenol/ethanol=4/1 by volume, 0.3 to 0.5 g of accurately weighed dried polyamide was dissolved under stirring at 20 to 30° C. The terminal amino concentration was measured by neutralization titration of the resultant complete solution with a N/100 hydrochloric acid under stirring.

(4) Terminal Carboxyl Concentration

After reading the stirring torque, molten polyamide was discharged from the batch polymerization vessel, which was solidified by cooling and dried. Into 30 cc of benzyl alcohol, 0.3 to 0.5 g of accurately weighed dried polyamide was dissolved with stirring at 160 to 180° C. under nitrogen flow. After cooling the resultant complete solution to 80° C. under nitrogen flow and adding 10 cc of methanol with stirring, the terminal carboxyl concentration was measured by neutralization titration with a N/100 aqueous solution of sodium hydroxide.

(5) Mole Balance

Determined by analysis based on second-order rate equation of amidation using the measured terminal amino concentration and terminal carboxyl concentration.

(6) Number Average Molecular Weight

Calculated from the following Equation E using the measured terminal amino concentration and terminal carboxyl concentration:

Number average molecular weight=$2 \times 10^6/([NH_2]+[COOH])$ (E) wherein $[NH_2]$ is the terminal amino concentration (μeq/g) and $[COOH]$ is the terminal carboxyl concentration (μeq/g).

(7) Relative Viscosity

After reading the stirring torque, molten polyamide was discharged from the batch polymerization vessel, which was solidified by cooling and dried. Into 100 cc of a 96% sulfuric acid, one gram of accurately weighed dried polyamide was dissolved at 20 to 30° C. with stirring. After competing the dissolution, 5 cc of the resultant solution was placed in Cannon-Fenske viscometer and allowed to stand for 10 min in a thermostatic chamber of 25±0.03° C. Then, the dropping time (t) was measured. The dropping time ($t_0$) of the 96% sulfuric acid itself was measured in the same manner. The relative viscosity was calculated from the following Equation F using the measured t and $t_0$:

Relative viscosity=$t/t_0$ (F).

EXAMPLES 1–4

(1) Development of Estimating Equation

After charging adipic acid, a stainless 50-L vessel equipped with a stirrer, a torque meter, a partial condenser, a total condenser, a nitrogen gas inlet and a dropping line was replaced with nitrogen gas and then the temperature was raised to 190° C. with stirring under a small amount of nitrogen flow by heating with a heating medium. Then, m-xylylenediamine was continuously added dropwise to molten adipic acid from the dropping line under atmospheric pressure over two hours while stirring the molten adipic acid at 40 rpm. The total amount of the charged adipic acid and m-xylylenediamine was 25.00 kg. During the dropwise addition, the inner temperature was continuously raised to 250° C. Water being distilled with the dropwise addition of m-xylylenediamine was removed from the reaction system through the partial condenser and the total condenser each being kept at 100° C. After completing the dropwise addition of m-xylylenediamine, the pressure was held at atmospheric pressure for 20 min with continuous stirring while raising the temperature at a rate of 0.2° C./min. Then, the pressure was decreased to 80 kPa over 5 min and held there for 15 min. Thereafter, the stirring torque at the set point was measured. Using the measured stirring torque, the melt viscosity at the set point was calculated from Equation D which was developed in advance by determining the empirical constants from the measured values of stirring torque, number of rotation and melt viscosity. Immediately after the measurement of the stirring torque, polyamide was discharged and solidified by water cooling, and the end group concentrations of the solidified polyamide was analyzed.

The polymerization was repeated in the same manner as above except for changing the mole balance of the resultant polyamide by changing the charge mole balance variously while fixing the total amount of adipic acid and m-xylylenediamine to 25.00 kg. From the melt viscosity calculated from the measured stirring torque and the mole balance calculated from the analyzed end group concentrations of polyamide, the following estimating Equation G was obtained for the mole balance range of 0.990 to 0.997. The number of samples was 6 and the correlation coefficient was 0.985.

$$\text{Mole balance} = 0.0002689 \times \text{melt viscosity (Pa·s)} + 0.9572 \quad (G)$$

(2) Estimation of Mole Balance

Using the same polymerization apparatus and the same polymerization conditions as used for developing the estimating equation, polyamide was produced. The mole balance of the charged adipic acid and m-xylylenediamine was adequately changed by using an excess amount of adipic acid while taking the amount of monomer to be escaped during the polymerization into consideration.

The melt viscosity calculated from the stirring torque measured at the set point, the estimated mole balance calculated from the estimating equation, and the measured mole balance obtained from the end group concentrations of polyamide are shown in Table 1. As seen from Table 1, the mole balance can be estimated with an error within ±0.0003 of the measured values.

TABLE 1

|  | Examples | | | |
| --- | --- | --- | --- | --- |
|  | 1 | 2 | 3 | 4 |
| Melt viscosity (Pa · s) | 127.38 | 134.39 | 135.93 | 144.11 |
| Estimated mole balance | 0.9915 | 0.9933 | 0.9938 | 0.9960 |
| Measured mole balance | 0.9918 | 0.9930 | 0.9939 | 0.9960 |

EXAMPLES 5–8

(1) Development of Estimating Equation

Using 1,3-bis(aminomethyl)cyclohexane in place of m-xylylenediamine, polyamide was produced in the same polymerization apparatus as used in Example 1. After charging adipic acid, the vessel was replaced with nitrogen gas and then the temperature was raised to 180° C. with stirring under a small amount of nitrogen flow by heating with a heating medium. Then, 1,3-bis(aminomethyl)cyclohexane was continuously added dropwise to molten adipic acid from the dropping line under atmospheric pressure over two hours while stirring the molten adipic acid at 40 rpm. The total amount of the charged adipic acid and 1,3-bis(aminomethyl)cyclohexane was 25.00 kg. During the dropwise addition, the inner temperature was continuously raised to 245° C. Water being distilled with the dropwise addition of 1,3-bis(aminomethyl)cyclohexane was removed from the reaction system through the partial condenser and the total condenser each being kept at 100° C. After completing the dropwise addition of 1,3-bis(aminomethyl)cyclohexane, the pressure was held at atmospheric pressure for 20 min with continuous stirring while raising the temperature at a rate of 0.3° C./min. Then, the pressure was decreased to 80 kPa over 5 min and held there for 15 min. Thereafter, the stirring torque was measured and polyamide was discharged immediately thereafter. The melt viscosity at the set point was calculated from Equation D which was developed in advance by determining the empirical constants. Separately, the end group concentrations of polyamide solidified by water cooling were analyzed.

The polymerization was repeated in the same manner as above except for changing the mole balance of the resultant polyamide by changing the charge mole balance variously while fixing the total amount of adipic acid and 1,3-bis(aminomethyl)cyclohexane to 25.00 kg. From the melt viscosity calculated from the measured stirring torque and the mole balance calculated from the analyzed end group concentrations of polyamide, the following estimating Equation H was obtained for the mole balance range of 0.985 to 0.997. The number of samples was 11 and the correlation coefficient was 0.939.

$$\text{Mole balance} = 0.0001061 \times \text{melt viscosity (Pa·s)} + 0.9741 \quad (H)$$

(2) Estimation of Mole Balance

Using the same polymerization apparatus and the same polymerization conditions as used for developing the estimating equation, polyamide was produced. The mole balance of the charged adipic acid and 1,3-bis(aminomethyl)cyclohexane was adequately changed by using an excess amount of adipic acid while taking the amount of monomer to be escaped during the polymerization into consideration.

The melt viscosity calculated from the stirring torque measured at the set point, the estimated mole balance calculated from the estimating equation, and the measured mole balance obtained from the end group concentrations of polyamide are shown in Table 2. As seen from Table 2, the mole balance can be estimated with an error within ±0.0004 of the measured values.

TABLE 2

|  | Examples | | | |
| --- | --- | --- | --- | --- |
|  | 5 | 6 | 7 | 8 |
| Melt viscosity (Pa · s) | 178.59 | 191.24 | 202.39 | 209.20 |
| Estimated mole balance | 0.9930 | 0.9944 | 0.9956 | 0.9963 |
| Measured mole balance | 0.9931 | 0.9946 | 0.9960 | 0.9962 |

COMPARATIVE EXAMPLE 1

The polymerization was conducted under the same conditions and mole balance as in Example 7 while using 1,3-bis(aminomethyl)cyclohexane as the diamine. After reducing to 80 kPa, the pressure was held there for 5 min (10 min shorter than in the case of Example 7). Thereafter, the melt viscosity was calculated from the stirring torque and the mole balance was calculated from Equation H. The calculated melt viscosity was 180.4 Pa·s. The estimated mole balance was 0.9935 and the measured mole balance was 0.9957, indicating an error of 2/1000 or more of the measured value.

COMPARATIVE EXAMPLE 2

The polymerization was conducted under the same conditions and mole balance as in Example 5 except for changing the total charged amount of adipic acid and 1,3-bis(aminomethyl)cyclohexane to 25.80 kg. The melt viscosity calculated from the stirring torque was 180.4 Pa·s. The estimated mole balance calculated from Equation H was 0.9957, and the measured mole balance was 0.9930, indicating an error of about 3/1000 of the measure value.

As seen from Comparative Example 1, it is important for a high estimating accuracy to make the polymerization history until the set point for measuring the melt viscosity uniform from batch to batch. Comparative Example 2 clearly shows that, for the estimation of the mole balance from the melt viscosity calculated from the stirring torque during the melt polymerization, it is preferred to make the total amount of polyamide in the batch polymerization vessel uniform from batch to batch, and shows that the variation of the total amount is sure to cause estimating errors.

EXAMPLES 9–13

(1) Development of Estimating Equation

After charging adipic acid, a stainless 50-L vessel equipped with a stirrer, a torque meter, a partial condenser, a total condenser, a nitrogen gas inlet and a dropping line was replaced with nitrogen gas and then the temperature was raised to 190° C. with stirring under a small amount of nitrogen flow by heating with a heating medium. Then, m-xylylenediamine was continuously added dropwise to molten adipic acid from the dropping line under atmospheric pressure over two hours while stirring the molten adipic acid at 40 rpm. The total amount of the charged adipic acid and m-xylylenediamine was 25.00 kg. During the dropwise addition, the inner temperature was continuously raised to 250° C. Water being distilled with the dropwise addition of m-xylylenediamine was removed from the reaction system through the partial condenser and the total condenser each being kept at 100° C. After completing the dropwise addition of m-xylylenediamine, the pressure was held at atmospheric pressure for 20 min with continuous stirring while raising the temperature at a rate of 0.2° C./min. Then, the pressure was decreased to 80 kPa over 5 min and held there for a predetermined period of time. After starting the holding at 80 kPa, the temperature of heating medium was controlled so as to allow the temperature of reaction solution (solution temperature) to reach 260° C. After holding at 80 kPa for a predetermined period of time, the solution temperature, the number of rotation and the stirring torque were measured, and the polyamide was discharged immediately thereafter to measure the melt viscosity, the end group concentrations (number average molecular weight) and the relative viscosity.

The same procedures were repeated while changing the charge mole balance (m-xylylene diamine/adipic acid) within the range of 0.990 to 1.000 and changing the hold time at 80 kPa within the range of 25 to 60 min, thereby determining the empirical constants c to j of the estimating Equations B to D (number of samples=15).

(2) Estimation of Melt Viscosity, Number Average Molecular Weight and Relative Viscosity Using the same polymerization apparatus as used for developing the estimating equation, polyamide was produced under the polymerization conditions shown in Table 3. The melt viscosity, number average molecular weight and relative viscosity estimated from the stirring torque, and the melt viscosity, number average molecular weight and relative viscosity manually measured are shown in Table 3.

TABLE 3

| | Examples | | | | |
|---|---|---|---|---|---|
| | 9 | 10 | 11 | 12 | 13 |
| Hold time at 80 kPa (min) | 60 | 40 | 25 | 25 | 40 |
| Charge mole balance | 0.991 | 0.995 | 0.997 | 1.000 | 0.993 |
| Solution temperature (° C.) | 259 | 258 | 257 | 257 | 258 |
| Estimated values | | | | | |
| melt viscosity (Pa · s) | 216.2 | 222.5 | 222.8 | 228.6 | 218.3 |
| number average molecular weight | 16020 | 16770 | 16700 | 17470 | 16340 |
| relative viscosity | 2.09 | 2.14 | 2.13 | 2.18 | 2.11 |
| Measured values | | | | | |
| melt viscosity (Pa · s) | 209.3 | 215.5 | 221.0 | 237.3 | 226.1 |
| number average molecular weight | 15800 | 16400 | 16900 | 17500 | 16300 |
| relative viscosity | 2.08 | 2.12 | 2.14 | 2.19 | 2.11 |

As seen from Table 3, the melt viscosity can be estimated with an error within ±10 Pa·s of the measured value, the number average molecular weight can be estimated with an error within ±400 of the measured value, and the relative viscosity can be estimated with an error within ±0.02 of the measured value. The influence of factors such as the melt history in the polymerization vessel and the mole balance on the estimated results was not found. It can be also seen that the solution temperature can be corrected in Equations B and C.

EXAMPLES 14–16

(1) Development of Estimating Equation

In this Example, the polymerization was conducted in the same polymerization apparatus as used in Example 9 while using 1,3-bis(aminomethyl)cyclohexane in place of m-xylylenediamine. After charging adipic acid, the vessel was replaced with nitrogen gas and then the temperature was raised to 180° C. with stirring under a small amount of nitrogen flow by heating with a heating medium. Then, 1,3-bis(aminomethyl)cyclohexane was continuously added dropwise to molten adipic acid from the dropping line under atmospheric pressure over two hours while stirring the molten adipic acid at 40 rpm. The total amount of the charged adipic acid and 1,3-bis(aminomethyl)cyclohexane was 25.00 kg. During the dropwise addition, the inner temperature was continuously raised to 245° C. Water being distilled with the dropwise addition of 1,3-bis(aminomethyl) cyclohexane was removed from the reaction system through the partial condenser and the total condenser each being kept at 100° C. After completing the dropwise addition of 1,3-bis(aminomethyl)cyclohexane, the pressure was held at atmospheric pressure for 20 min with continuous stirring while raising the temperature at a rate of 0.3° C./min. Then, the pressure was decreased to 80 kPa over 5 min and held there for a predetermined period of time. After starting the holding at 80 kPa, the temperature of heating medium was controlled so as to allow the temperature of reaction solution (solution temperature) to reach 260° C. After holding at 80 kPa for a predetermined period of time, the solution temperature, the number of rotation and the stirring torque were measured, and the polyamide was discharged immediately thereafter to measure the melt viscosity, the end group concentrations (number average molecular weight) and the relative viscosity.

The same procedures were repeated while changing the charge mole balance (1,3-bis(aminomethyl)cyclohexane/adipic acid) within the range of 0.990 to 1.000 and changing the hold time at 80 kPa within the range of 25 to 60 min, thereby determining the empirical constants c to j of the estimating Equations B to D (number of samples=15).

(2) Estimation of Melt Viscosity, Number Average Molecular Weight and Relative Viscosity Using the same polymerization apparatus as used for developing the estimating equation, polyamide was produced under the polymerization conditions shown in Table 4. The melt viscosity, number average molecular weight and relative viscosity estimated from the stirring torque, and the melt viscosity, number average molecular weight and relative viscosity manually measured are shown in Table 4.

COMPARATIVE EXAMPLE 3

The polymerization was conducted under the same conditions as in Example 16 while using 1,3-bis(aminomethyl)cyclohexane as the diamine. After completing the dropwise addition of 1,3-bis(aminomethyl)cyclohexane, the pressure was held at atmospheric pressure for 20 min with continuous stirring while raising the temperature at a rate of 0.3° C./min. The pressure was further held at atmospheric pressure without decreasing for additional 30 min. After the holding at atmospheric pressure for 50 min, the solution temperature, the number of rotation and the stirring torque were measured, and the polyamide was discharged immediately thereafter to measure the melt viscosity, the end group concentrations (number average molecular weight) and the relative viscosity. The results are shown in Table 4.

COMPARATIVE EXAMPLE 4

The polymerization was conducted in the same manner as in Example 16 except for changing the total charge amount of adipic acid and 1,3-bis(aminomethyl)cyclohexane to 25.80 kg. The results are shown in Table 4.

TABLE 4

|  | Examples | | | Comparative Examples | |
| --- | --- | --- | --- | --- | --- |
|  | 14 | 15 | 16 | 3 | 4 |
| Hold time at 80 kPa (min) | 60 | 40 | 25 | atmospheric pressure | 25 |
| Charge mole balance | 25 | 25 | 25 | 25 | 25.8 |
| Solution temperature (° C.) | 261 | 258 | 256 | 256 | 256 |
| Estimated values |  |  |  |  |  |
| melt viscosity (Pa · s) | 469.5 | 361.2 | 484.4 | 400.3 | 566.0 |
| number average molecular weight | 16010 | 14610 | 15520 | 14770 | 16160 |
| relative viscosity | 2.39 | 2.30 | 2.36 | 2.31 | 2.40 |
| Measured values |  |  |  |  |  |
| melt viscosity (Pa · s) | 459.1 | 370.7 | 487.4 | 408.1 | 490.6 |
| number average molecular weight | 16200 | 14800 | 15400 | 15600 | 15500 |
| relative viscosity | 2.41 | 2.31 | 2.35 | 2.35 | 2.35 |

As seen from Table 4, the melt viscosity can be estimated with an error within ±10 Pa·s of the measured value, the number average molecular weight can be estimated with an error within ±200 of the measured value, and the relative viscosity can be estimated with an error within ±0.02 of the measured value (Examples 14–16). It can been seen that the melt viscosity, the number average molecular weight and the relative viscosity can be estimated from the stirring torque during the melt polymerization even when the type of polyamide is changed.

On the other hand, as seen from Comparative Examples 3–4, it is preferred for the estimation of the melt viscosity, molecular weight and relative viscosity from the stirring torque to make the pressure in the batch polymerization vessel uniform with the pressure at the time when the estimating equation is determined, because the pressure significantly affects the estimating accuracy of the number average molecular weight and relative viscosity. In addition, it can be seen that the total amount of polyamide in the batch polymerization vessel is preferably uniform from batch to batch, and the variation thereof is sure to cause estimating errors.

EXAMPLE 17

Into molten adipic acid heated to 190° C. in a 6-m$^3$ stainless batch polymerization vessel equipped with a stirrer, a torque meter, a partial condenser, a total condenser, a nitrogen gas inlet and a dropping line, m-xylylenediamine was continuously added dropwise from the dropping line under atmospheric pressure over 140 min while stirring the molten adipic acid at 40 rpm. The total charge amount of adipic acid and m-xylylenediamine was 3500 kg. During the dropwise addition, the inner temperature was continuously raised to 246° C. Water being distilled with the dropwise addition of m-xylylenediamine was removed from the reaction system through the partial condenser and the total condenser each being kept at 100° C. After completing the dropwise addition of m-xylylenediamine, the pressure was held at atmospheric pressure for 20 min with continuous stirring while raising the inner temperature to 250° C. Then, the pressure was decreased to 80 kPa over 5 min, held there for 15 min, and then the inner temperature was raised to 256° C. Immediately after reaching 256° C., the number of rotation of the stirring blade was changed to 20 rpm. The point where the number of rotation reached 20 rpm was employed as the set point, and the stirring torque there was measured. From the result, the melt viscosity at the set point was calculated using Equation D having its empirical constants determined in advance. Thereafter, the melt polymerization was continued under the same conditions while controlling the temperature of heating medium so as to allow the inner temperature to reach 260° C. After holding for a predetermined period of time, the melt polymerization was terminated and the stirring was stopped. The polyamide was discharged from a die at a lower portion of the polymerization vessel under a back pressure of nitrogen, and then solidified by water cooling to obtain polyamide pellets. The point just before the termination of the melt polymerization was employed as the end point of the melt polymerization. Using Equation D, the melt viscosity at the end point was calculated from the measured inner temperature and stirring torque. The pellets of melt-polymerized polyamide were analyzed for the mole balance, number average molecular weight and relative viscosity.

The same procedures were repeated while changing the charge mole balance (m-xylylene diamine/adipic acid) within the range of 0.990 to 1.000 and changing the hold time from the set point until the end point within the range of 10 to 60 min, thereby determining the empirical constants a to h of Equations A to C (number of samples=10).

(2) Melt Polymerization

Melt polymerization was conducted in the same manner as in the case of developing the estimating equations while changing the charge mole balance (m-xylylene diamine/adipic acid) within the range of 0.992 to 0.998 and changing the hold time from the set point to the end point within the range of 10 to 40 min. The melt-polymerized polyamides of 15 batches were estimated for the mole balance, number average molecular weight and relative viscosity from Equations A to C.

(3) Solid Phase Polymerization

Into a 13-m$^3$ jacketed vacuum tumble dryer of batch type, about 3000 kg pellets of the melt-polymerized polyamide from each batch was charged. After replacing the dryer with nitrogen, the temperature was started to be raised using a heating medium under nitrogen atmosphere. The evacuation was started when the inner temperature reached 120° C. When the inner temperature reached 140° C. and thereafter, the evaluation of the number average molecular weight of polyamide under solid phase polymerization was started by successive calculation with one minute update interval on the basis of second-order rate equation of amidation while using estimated mole balance, estimated number average molecular weight (taken as the number average molecular weight at the initiation of solid phase polymerization), temperature and pressure. The inner temperature was raised to 205° C. When the calculated result of the number average molecular weight of polyamide under solid phase polymerization reached an aimed value, the pressure was returned to atmospheric pressure by nitrogen and the cooling by heating medium was started. When the inner temperature reached 60° C., the pellets of solid phase-polymerized polyamide were discharged to measure the relative viscosity. The results of measurement of the relative viscosity of the solid phase-polymerized polyamides of 15 batches are shown in Table 5. The polyamide pellets could be introduced into the vacuum tumble dryer immediately after melt polymerization and the solid phase polymerization could be initiated with little time lag, without needing time from the completion of melt polymerization to the initiation of solid phase polymerization.

COMPARATIVE EXAMPLE 5

(1) Melt Polymerization

Melt polymerization was conducted in the same manner as in the case of developing the estimating equations of Example 17 while changing the charge mole balance (m-xylylene diamine/adipic acid) within the range of 0.992 to 0.998 and changing the hold time from the set point to the end point within the range of 10 to 40 min. The melt-polymerized polyamides of 15 batches were measured for the mole balance, number average molecular weight and relative viscosity by chemical analysis.

(2) Solid Phase Polymerization

The solid phase polymerization was conducted in the same manner using the same apparatus as in Example 17. When the inner temperature reached 140° C. and thereafter, the evaluation of the number average molecular weight of polyamide under solid phase polymerization was started by successive calculation with one minute update interval on the basis of second-order rate equation of amidation while using measured mole balance, measured number average molecular weight (taken as the number average molecular weight at the initiation of solid phase polymerization), temperature and pressure. The inner temperature was raised to 205° C. When the calculated result of the number average molecular weight of polyamide under solid phase polymerization reached the value of Example 17, the pressure was returned to atmospheric pressure by nitrogen and the cooling by heating medium was started. When the inner temperature reached 60° C., the pellets of solid phase-polymerized polyamide were discharged to measure the relative viscosity. The results of measurement of the relative viscosity of the solid phase-polymerized polyamides of 15 batches are shown in Table 5. About six hours were taken to chemically analyze the mole balance, number average molecular weight and relative viscosity of the melt-polymerized polyamides, and the solid phase polymerization could not be conducted until the analysis of the melt-polymerized polyamide was completed.

TABLE 5

|  | Example 17 | Comparative Example 5 |
|---|---|---|
| Number of samples (number of batches) | 15 | 15 |
| Relative viscosity of solid phase-polymerized polyamide | | |
| average | 2.61 | 2.61 |
| maximum | 2.65 | 2.66 |
| minimum | 2.59 | 2.53 |
| standard deviation | 0.02 | 0.04 |

As seen from Table 5, by estimating the properties of melt-polymerized polyamide according to the method of the present invention, the solid phase-polymerized polyamide having a relative viscosity stable from batch to batch can be produced. It can be found that the batch-to-batch stability is somewhat higher in the present invention as compared with the method where the properties are measured by chemical analysis. In addition, the solid phase polymerization could be conducted in the present invention immediately after the melt polymerization with no time lag, thereby significantly enhancing the productivity.

The production method of polyamide of the present invention has the following effects:

(1) The mole balance, molecular weight and relative viscosity of polyamide under melt polymerization can be rapidly estimated from the measured value of melt viscosity.

(2) Since the mole balance is easily obtained in real time, the subsequent production conditions in a batch can be easily controlled.

(3) Since the mole balance, molecular weight and relative viscosity can be easily obtained in real time, the production results of a batch can be rapidly reflected in the next and subsequent batches.

(4) By estimating the melt viscosity from the stirring torque, the mole balance, molecular weight and relative viscosity can be easily estimated without needing expensive measuring apparatus.

(5) Since the mole balance, molecular weight and relative viscosity of melt-polymerized polyamide can be easily and rapidly estimated, the conditions of solid phase polymerization can be determined without delay.

(6) Since the mole balance, molecular weight and relative viscosity can be easily and rapidly estimated, the conditions of melt polymerization in the next and subsequent batches can be easily controlled.

(7) By the estimation based on the stirring torque, the properties of melt-polymerized polyamide (mole balance, molecular weight, relative viscosity) can be easily estimated without needing expensive measuring apparatus.

As describe above, the present invention provides a method for easily determining and controlling the production conditions of melt-polymerized polyamide and solid phase-polymerized polyamide, and is of great industrial advantage.

What is claimed is:

1. A production method of polyamide by batch melt polymerization which comprises:
   (1) a step of developing at least one estimating equation selected from the group consisting of (a) an estimating equation for calculating a mole balance (diamine unit/carboxylic acid unit) of polyamide under melt polymerization from a melt viscosity of polyamide measured at a set point during the melt polymerization, (b) an estimating equation for calculating a molecular weight of polyamide under melt polymerization from the melt viscosity, and (c) an estimating equation for calculating a relative viscosity of polyamide under melt polymerization from the melt viscosity;
   (2) a step of estimating, so as to provide an estimation, using said at least one estimating equation, at least one property selected from the group consisting of a mole balance, a molecular weight and a relative viscosity of polyamide under melt polymerization from a melt viscosity of polyamide measured at a set point during melt polymerization in next and subsequent; and
   (3) a step of continuing the melt polymerization in the next and subsequent batches under conditions determined by results of the estimation.

2. The production method according to claim 1, wherein polymerization conditions (time, pressure, temperature) until the polyamide is discharged from a polymerization vessel are determined on the basis of the estimated mole balance.

3. The production method according to claim 1, wherein the estimating equation for calculating the mole balance is a linear equation represented by the following Equation A:

$$\text{Mole balance}=a \times MV+b \tag{A}$$

wherein MV is melt viscosity (Pa·s), and a and b are empirical constants.

4. The production method according to claim 1, wherein polymerization conditions (time, pressure, temperature) until the polyamide is discharged from a polymerization vessel are determined on the basis of the estimated molecular weight.

5. The production method according to claim 1, wherein polymerization conditions (time, pressure, temperature) until the polyamide is discharged from a polymerization vessel are determined on the basis of the estimated relative viscosity.

6. The production method according to claim 1, wherein the melt viscosity of polyamide is calculated from a measured stirring torque using an estimating equation which is developed from a relationship between the melt viscosity and the stirring torque generated by a rotation of stirring blade for stirring and mixing the polyamide.

7. The production method according to claim 6, wherein a pressure of a batch polymerization vessel at the measurement of the stirring torque is in a variation range within ±10 kPa of an average pressure between batches conducted for developing the estimating equation.

8. The production method according to claim 1, wherein the set point during melt polymerization is determined by a temperature of polyamide in a batch polymerization vessel.

9. The production method according to claim 1, wherein the set point during melt polymerization is determined by a time taken from initiation of amidation reaction.

10. The production method according to claim 1, wherein a total amount of a polyamide of a previous batch remaining in a batch polymerization vessel and starting materials for polyamide charged at the beginning of melt polymerization is in a variation range within ±1/50 of an average total amount between batches conducted for developing the estimating equation.

11. The production method according to claim 1, wherein the melt polymerization for producing polyamide in a batch polymerization vessel is conducted by directly adding a diamine component to a molten dicarboxylic acid component in the absence of solvent.

12. The production method according to claim 11, wherein the mole balance of polyamide under melt polymerization is estimated from the melt viscosity at the set point during melt polymerization, and an addition amount of the diamine component is controlled on the basis of the estimated mole balance.

13. The production method according to claim 11, wherein the diamine component comprises 70 mol % or more of xylylene diamine.

14. The production method according to claim 11, wherein the diamine component comprises 70 mol % or more of bis(aminomethyl)cyclohexane.

15. The production method according to claim 11, wherein the dicarboxylic acid component comprises 50 mol % or more of adipic acid.

16. A production method of polyamide by solid phase polymerization of batch melt-polymerized polyamide, which comprises:
    (1) developing an estimating equation for calculating a mole balance (diamine unit/carboxylic acid unit) of polyamide under melt polymerization from a melt viscosity of polyamide measured at a set point during the melt polymerization, and calculating a mole balance of polyamide at the set point during the melt polymerization of next and subsequent batches from the estimating equation;
    (2) developing an estimating equation for calculating a molecular weight or relative viscosity of polyamide from the melt viscosity, and calculating a molecular weight or relative viscosity at an end point of the melt polymerization of next and subsequent batches from the estimating equation; and
    (3) determining conditions (temperature, time and pressure) of the solid phase polymerization of the melt-polymerized polyamide on the basis of the calculated values in the steps (1) and (2).

17. The production method according to claim 16, wherein the estimating equation for calculating the mole balance is represented by the following Equation A for a mole balance range of 0.997 or less, and 1.003 or more:

$$\text{Mole balance} = a \times MV + b \quad (A)$$

wherein MV is melt viscosity (Pa·s), and a and b are empirical constants.

18. The production method according to claim 16, wherein the set point during melt polymerization is determined by a temperature of polyamide in a batch polymerization vessel.

19. The production method according to claim 16, wherein the set point during melt polymerization is determined by a time taken from initiation of amidation reaction.

20. The production method according to claim 16, wherein the estimating equation for calculating the molecular weight of polyamide from the melt viscosity at the end point of melt polymerization is represented by the following Equation B:

$$c \times \log(MW) = \log(MV) + d/T + e \quad (B)$$

wherein MW is molecular weight, MV is melt viscosity (Pa·s), T is temperature (° C.), and c, d and e are empirical constants.

21. The production method according to claim 16, wherein the estimating equation for calculating the relative viscosity of polyamide from the melt viscosity at the end point of melt polymerization is represented by the following Equation C:

$$f \times \log(RV) = \log(MV) + g/T + h \quad (C)$$

wherein RV is relative viscosity, MV is melt viscosity (Pa·s), T is temperature (° C.), and f, g and h are empirical constants.

22. The production method according to claim 16, wherein the melt viscosity at the set point during melt polymerization and the melt viscosity at the end point of melt polymerization are calculated from a relationship between the melt viscosity and a stirring torque generated by a rotation of stirring blade for stirring and mixing polyamide.

23. The production method according to claim 22, wherein a total amount of a polyamide of a previous batch remaining in a batch polymerization vessel and starting materials for polyamide charged at the beginning of melt polymerization is in a variation range within ±1/50 of an average total amount between batches conducted for establishing the relationship.

24. The production method according to claim 22, wherein a pressure of a batch polymerization vessel at the measurement of the stirring torque is in a variation range within ±10 kPa of an average pressure between batches conducted for establishing the relationship.

25. The production method according to claim 16, wherein the melt polymerization for producing polyamide in a batch polymerization vessel is conducted by directly adding a diamine component to a molten dicarboxylic acid component in the absence of solvent.

26. The production method according to claim 25, wherein the diamine component comprises 70 mol % or more of xylylene diamine.

27. The production method according to claim 25, wherein the diamine component comprises 70 mol % or more of bis(aminomethyl)cyclohexane.

28. The production method according to claim 25, wherein the dicarboxylic acid component comprises 50 mol % or more of adipic acid.

* * * * *